(12) United States Patent
Harik

(10) Patent No.: US 9,613,316 B2
(45) Date of Patent: Apr. 4, 2017

(54) METHOD FOR IMPROVING EFFICIENCY IN AN OPTIMIZING PREDICTIVE MODEL USING STOCHASTIC GRADIENT DESCENT

(71) Applicant: Georges Harik, Palo Alto, CA (US)

(72) Inventor: Georges Harik, Palo Alto, CA (US)

( * ) Notice: Subject to any disclaimer, the term of this patent is extended or adjusted under 35 U.S.C. 154(b) by 410 days.

(21) Appl. No.: 14/010,436

(22) Filed: Aug. 26, 2013

(65) Prior Publication Data

US 2014/0058991 A1 Feb. 27, 2014

Related U.S. Application Data

(60) Provisional application No. 61/693,653, filed on Aug. 27, 2012.

(51) Int. Cl.
G06K 9/00 (2006.01)
G06N 99/00 (2010.01)
G06N 3/08 (2006.01)

(52) U.S. Cl.
CPC ............. G06N 99/005 (2013.01); G06K 9/00 (2013.01); G06N 3/088 (2013.01)

(58) Field of Classification Search
None
See application file for complete search history.

(56) References Cited

PUBLICATIONS

Tsuruoka09, "Stochastic Gradient Descent Training for L1-regularized Log-linear Models with Cumulative Penalty", Proceedings of the 47th Annual Meeting of the ACL and the 4th IJCNLP, pp. 477-485, [online], Aug. 2-7, 2009 [retrieved on Jun. 1, 2015]. Retrieved from the Internet:<URL:http://www.google.com/url?sa=t&rct=j&q=&esrc=s&source=web&cd>.*

Sloan, et al., On Software Design for Stochastic Processors, DAC 2012 [online], Jun. 3-7, 2012 [retrieved on Dec. 5, 2015]. Retrieved from the Internet:<URL: http://ieeexplore.ieee.org/stamp/stamp.jsp?tp=&arnumber=6241613>.*

(Continued)

Primary Examiner — Stanley K Hill
Assistant Examiner — Nathan Brown, Jr.
(74) Attorney, Agent, or Firm — VLP Law Group LLP; Edward C Kwok

(57) ABSTRACT

A method optimizes a predictive computation model efficiently. The method includes (i) selecting model parameters that are expected to take real values within a one-sided predetermined range; and (ii) iteratively: (a) receiving a set of input values; (b) executing the computation model based on the input values; (c) updating the values of the model parameters to minimize a loss function; and (d) examining each of the model parameters, such that, when the examined model parameter attains or moves past a value that is idempotent to the computation model, removing the model parameter from the computation model. In one embodiment, the predetermined range is either the range between a predetermined positive real value and positive infinity or the range between a predetermined negative real value and negative infinity. The predetermined positive real value or the predetermined negative real value may be an idempotent value to the model computation.

8 Claims, 2 Drawing Sheets

(56) References Cited

PUBLICATIONS

Zhang04, Solving Large Scale Linear Prediction Problems Using Stochastic Gradient Descent Algorithms Appearing in Proceedings of the 21st International Conference on Machine Learning, Baniff, Canada [online], 2004 [retrieved on Dec. 4, 2015]. Retrieved from the Internet:<URL:http://dl.acm.org/ft_gateway.cfm?id=1015332&ftid=273114&dwn=1>.*

Orr, Introduction to Radial Basis Function Networks [online], Apr. 1996 [retrieved on Jul. 9, 2016]. Retrieved from the Internet:<URL:http://www.cc.gatech.edu/~isbell/tutorials/rbf-intro.pdf>.*

* cited by examiner

METHOD FOR IMPROVING EFFICIENCY IN AN OPTIMIZING PREDICTIVE MODEL USING STOCHASTIC GRADIENT DESCENT

CROSS REFERENCE TO RELATED APPLICATIONS

The present application relates to and claims priority of U.S. provisional patent application ("Provisional Patent Application"), Ser. No. 61/693,653, entitled "Method for Improving Efficiency in an Optimizing Predictive Model using Stochastic Gradient Descent," filed on Aug. 27, 2012. The disclosure of the Provisional Patent Application is hereby incorporated by reference in its entirety.

BACKGROUND OF THE INVENTION

1. Field of the Invention

The present invention relates to improving computational efficiency in an optimizing predictive model. In particular, the present invention relates to improving computational efficiency in an optimizing predictive model that is optimized using a stochastic gradient descent method.

2. Discussion of the Related Art

In machine learning, an optimizing predictive model is a computational model that learns a function of its input values. One type of optimizing predictive model applies a stochastic gradient descent optimization technique over a loss function. Typically, the optimization procedure involves iteratively executing the model, and then differentiating the model to adapt the values of the model parameters to minimize the loss function. The complexity of such a computation task is typically at least proportional to the size of the model. Therefore, it is desirable to have a model that is smaller, and which requires fewer computational operations.

An optimizing predictive model may be implemented, for example, in a neural network. A neural network model is usually based on a graph consisting of nodes (referred to as "neurons") and directed, weighted edges that connect the neurons. The directed graph typically represents the function that is to be computed in the computational model. In a typical implementation, each neuron is assigned a simple computational task (e.g., a linear transformation followed by a squashing function, such as a logistic function) and the loss function is computed over the entire neural network model. The parameters of the neural network model are typically determined ("learned") using a method that minimizes the loss function. Stochastic gradient descent is a method that is often used to achieve the minimization. In stochastic gradient descent, optimization is achieved iteratively by (a) finding analytical gradients for the loss functions and (b) perturbing or moving the test values by a small amount in the direction of the gradient, until the loss function is minimized.

SUMMARY

According to one embodiment of the present invention, a method optimizes a predictive computation model efficiently. The method includes (i) selecting model parameters that are expected to take real values within a predetermined range, which may be one-sided; and (ii) iteratively: (a) receiving a set of input values; (b) executing the computation model based on the input values; (c) updating the values of the model parameters to minimize a loss function; and (d) examining each of the model parameters, such that, when the examined model parameter attains or moves past a value that is idempotent to the computation model, removing the model parameter from the computation model. In one embodiment, the predetermined range is either the range between a predetermined positive real value and positive infinity or the range between a predetermined negative real value and negative infinity. The predetermined positive real value or the predetermined negative real value may be an idempotent value to the model computation.

According to one embodiment of the present invention, to update the values of the model parameters, one or more derivatives of the computational model are computed with respect to one or more model parameters. An artificial term may be added to each derivative with respect to a model parameter which increases with the difference between the model parameter and its respective value that is idempotent to the computational model. Alternatively, sometimes while updating the values of the model parameters, the distance between a parameter and a corresponding idempotent value for the parameter may be divided by a value that is greater than one, thereby bringing the parameter closer to its idempotent value The methods of the present invention may be applicable to a computational model that predicts a next word in a sequence of text. The methods of the present invention may also be applicable to a computational model that searches for documents from which one or more text segments may be likely to have originated, had the document composer written more text.

The present invention is better understood upon consideration of the detailed description below.

DETAILED DESCRIPTION OF THE PREFERRED EMBODIMENTS

The methods of the present invention take advantage of the fact that, in any optimizing predictive model, during training of a particular function to be learned in the model, some model parameters will attain values that are idempotent to the computation. A model parameter having an idempotent value does not contribute to the function that is being computed, indicating that the model parameter is irrelevant to the particular function to be learned. For example, if a model parameter's contribution to the computation is additive, the parameter attaining the value of '0' would be idempotent. Likewise, if the model parameter's contribution to the computation is multiplicative, attaining a value of '1' would be idempotent. If the model parameter's contribution to the computation is rotational, then a rotation of 0 degrees would be idempotent. Typically, during the training process, a model parameter would move from its initial value towards its final value (including an idempotent value), settling in its final value after many iterations. During this process, the value of the model parameter may fluctuate about its final value.

According to one embodiment of the present invention, an optimizing predictive model is prepared such that its model parameters are each expected to take on real values within a one-sided range of [<special value>, infinity) or (−infinity, <special value>] (alternatively, the special value can also be just outside the range). The special value for each model parameter is typically selected to be an idempotent value of that model parameter.

Figure 1:
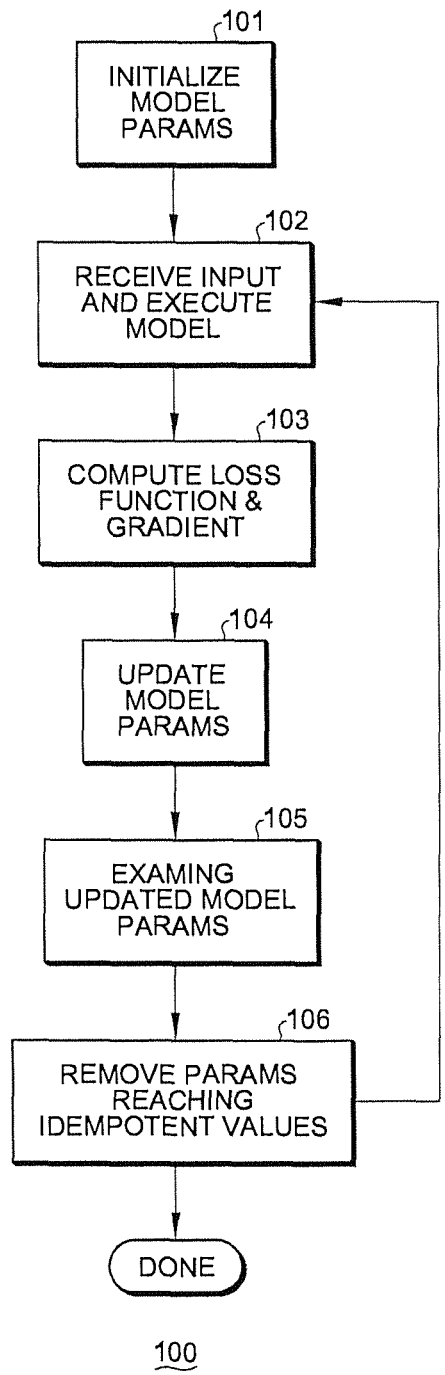
FIG. 1 is a flow chart showing optimization method 100, in accordance with one embodiment of the present invention.

FIG. 1 is a flow chart showing optimization method 100 suitable for implementing a optimizing predictive model, in accordance with one embodiment of the present invention. At step 101, at the beginning of the training process, the model parameters are each assigned a value within an expected range. The training process is expected to move the value of each model parameter in a way that minimizes the loss function; for some model parameters, the model parameters may reach a value that is idempotent to the computation model. At step 102, the computational model receives an input vector. According to one embodiment of the present invention, at step 103, a gradient of a loss function in the computation model may be included in the optimization process. Based on the gradient, which is typically a vector, the model parameters in the loss function may be updated at step 104 in a direction that reduces the loss function (e.g., by multiplying the gradient with a small negative value, projecting the product on each model parameter involved, and adjusting each component model parameter accordingly to achieve the reduced loss function). Also, an artificial term may be included in some or all of the derivatives of the loss function with respect to the model parameters. The artificial term is selected to increase the corresponding derivative with the distance between the value of the corresponding model parameter and its idempotent value. In other words, the loss function and its derivatives may be changed, to cause a parameter to be more likely to move towards its idempotent value. After each update, at step 105, the values of the model parameters are examined. When the examined model parameter either attains or moves past a value that is idempotent to the computational model, or reaches a predefined forbidden state, the computation involving that model parameter may be removed from the model computation at step 106. The steps 102-106 are repeated until a termination criterion is met. For example, the steps 102-106 may be terminated when successive evaluations of the loss function differ by less than a predetermined value.

Alternatively, at every predetermined number of iterations or at a suitable time point, the parameter value may be made closer to the idempotent value by dividing the difference between the parameter value and a corresponding idempotent value by a number greater than 1. If the final value of the model parameter is not its idempotent value, subsequent iterations would drive the parameter value away from its idempotent value towards the final value. However, if the final value of the model parameter is its idempotent value, the convergence to the idempotent value is hastened. After each update, the values of the model parameters are examined. When a model parameter attains the idempotent value or takes on a value outside the expected range, the computation involving that model parameter may be removed from the model computation.

Both the method of selecting derivatives and the method of bringing a model parameter closer to its idempotent value remove potentially unnecessary computations at an early time in a stochastic gradient method. As a result, the pruned model (i.e., the model with the idempotent model parameters removed) executes faster than the unpruned model. The computation model thus executes incrementally faster, as the training progresses. This technique is applicable to any computational model, where stochastic gradient descent is used to train the model.

Figure 2:
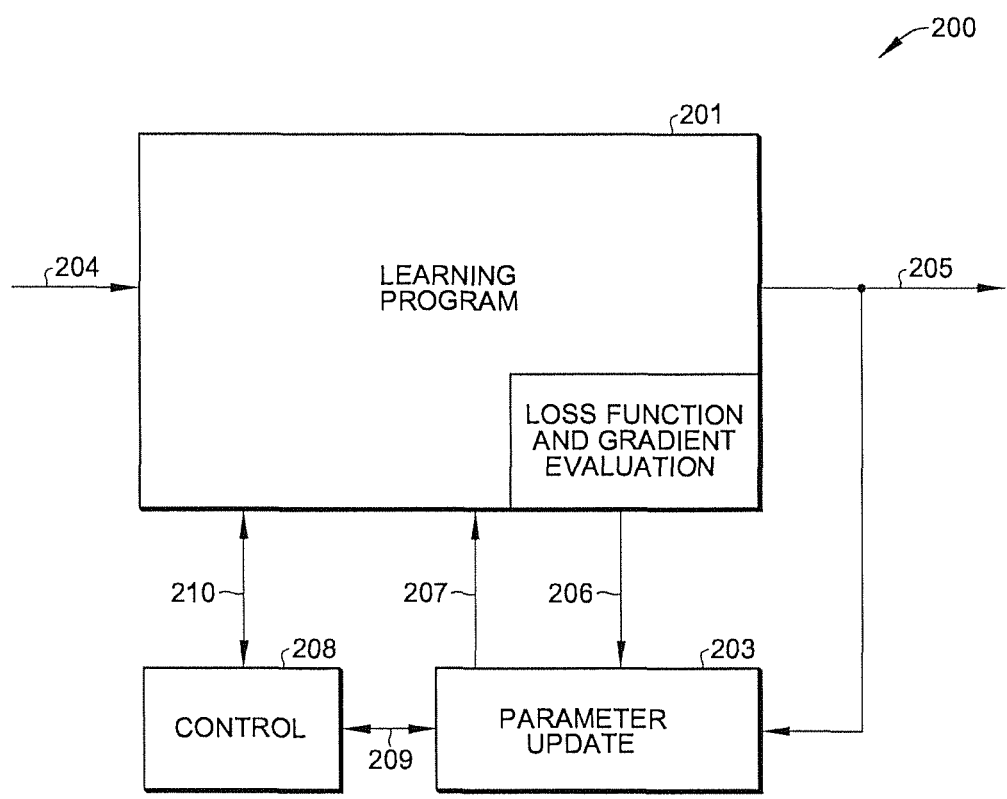
FIG. 2 is a block diagram of one implementation of optimizing predictive model 200, according to one embodiment of the present invention.

In one embodiment of the present invention, the method illustrated by flow chart 100 of FIG. 1 may be implemented in a computational environment, such as that shown in FIG. 2. FIG. 2 is a block diagram of one implementation of optimizing predictive model 200, according to one embodiment of the present invention. As shown in FIG. 2, optimizing predictive model 200 includes learning program 201, which receives input vector 204 from the training data and model parameter values 207 to provide output vector 205. Integrated into learning program 201 is stochastic gradient descent module 202 which carries out evaluation of the loss function and the gradient vector 206 for the loss function with respect to the model parameters. Along with the output vector, the gradient vector 206 is provided to parameter update module 203. The updated parameters are fed back into configuring learning program 201. Learning program 201 may be implemented in a computational environment that includes a number of parallel processors. In one implementation, each processor may be a graphics processor, to take advantage of computational structures optimized for arithmetic typical in such processors. Control unit 208 (e.g., a host computer system using conventional programming techniques) may configure the computational model for each program to be learned. Learning program 201 may be organized, for example, as a neural network model. The program model implemented in learning program 201 may be variable, taking into account, for example, the structure and values of the input vector and the structure and values of the expected output data. Control flow in the program model may be constructed based on the input vector or intermediate values ("states values") computed in the program model.

The methods of the present invention may be implemented, for example, in a neural network model. Computational models that are created using machine learning techniques find applications in, for example, predicting a possible next word or phrase in a text sequence, such as frequently encountered in a speech recognition application, for example. Another example is a document search application which identifies documents containing text segments from which a given text segment may likely have originated. This application is useful in searching text based on an approximate or incomplete query. The methods of the present invention may be used to build a search engine over text.

The above detailed description is provided to illustrate the specific embodiments of the present invention and is not intended to be limiting. Various modification and variations within the scope of the present invention are possible. The present invention is set forth in the following claims.

I claim:

1. In an optimizing predictive computation model, a method comprising:
   selecting model parameters that are expected to take real values within a predetermined range; and
   iteratively:
   (a) receiving a set of input values;
   (b) executing the computation model based on the input values;
   (c) updating the values of the model parameters to minimize a loss function and to move one or more of the model parameters each to a corresponding value that is idempotent to the computation model; and
   (d) examining each of the model parameters and, when an examined model parameter attains or passes through the corresponding value that is idempotent to the computation model, removing the examined model parameter and computations involving the examined model parameter from the computation model.

2. The method of claim 1 wherein the predetermined range is either the range between a predetermined positive real value and positive infinity or the range between a predetermined negative real value and negative infinity.

3. The method of claim 1, wherein updating the values of the model parameters comprises:

computing derivatives of a loss function in the computation model with respect to at least the one or more of the model parameters; and adapting the values of the model parameters in the direction of reducing the loss function.

4. The method of claim 3, wherein the derivatives of the loss function with respect to the one or more of the model parameters are each selected to include a term that increases with the difference between the corresponding model parameter and its respective value that is idempotent to the computational model.

5. The method of claim 1, wherein updating the values of the model parameters comprises dividing the difference between the value of each model parameter and its idempotent value by a value that is greater than 1.

6. The method of claim 1, wherein the computational model predicts a next word in a sequence of text.

7. The method of claim 1, wherein the computational model searches for documents responsive to a search query that contains text that is a part of, or in a different form than, text contained in the responsive documents.

8. The method of claim 1, wherein when one of the model parameters takes a value that is outside the predetermined range, that model parameter and computations involving that model parameter are removed from the computation model.

\* \* \* \* \*